United States Patent [19]

Crosier et al.

[11] Patent Number: 5,205,462

[45] Date of Patent: Apr. 27, 1993

[54] COMPRESSIVE BRAZING FIXTURE

[75] Inventors: Andrew D. Crosier, Canton; Mark R. Nock, Ypsilanti; Josef Hirmann, Farmington Hills, all of Mich.

[73] Assignee: Ford Motor Company, Dearborn, Mich.

[21] Appl. No.: 906,052

[22] Filed: Jun. 29, 1992

[51] Int. Cl.⁵ .............................................. B23K 37/00
[52] U.S. Cl. ................................ 228/44.3; 228/183; 29/726; 269/239; 269/254 R; 269/254 MW
[58] Field of Search ................. 228/44.3, 183, 212; 29/726.5, 726; 269/254 R, 239, 133, 254 MW

[56] References Cited

U.S. PATENT DOCUMENTS

| | | | |
|---|---|---|---|
| 830,128 | 9/1906 | Anderson | 269/254 MW |
| 1,410,060 | 3/1922 | Harter | 269/254 MW |
| 2,812,006 | 11/1957 | Berliant | |
| 3,726,466 | 4/1973 | Vedder et al. | 29/726 |
| 3,769,675 | 11/1973 | Chartet | 228/20 |
| 3,953,016 | 4/1976 | Gersbacher | 269/236 |
| 3,995,805 | 12/1976 | Gersbacher | 228/44.3 |
| 4,128,235 | 12/1978 | Gersbacher | 269/234 |
| 4,216,947 | 8/1980 | Chausse | 269/71 |
| 5,058,662 | 10/1991 | Nguyen | 165/76 |

FOREIGN PATENT DOCUMENTS

| | | | |
|---|---|---|---|
| 59-189073 | 10/1984 | Japan | 228/44.3 |
| 1454625 | 1/1989 | U.S.S.R. | 228/44.3 |

Primary Examiner—Richard K. Seidel
Assistant Examiner—Jeffrey T. Knapp
Attorney, Agent, or Firm—Raymond L. Coppiellie; Roger L. May

[57] ABSTRACT

A brazing fixture apparatus is disclosed for holding a heat exchanger core during a brazing operation. The fixture includes a generally rectangular frame including a contact member disposed on one side of the frame and a single lever extending axially along the length of the frame. The lever pivots from a first position to allow placement of the core onto the frame to a second position, in response to gravity, such that in the second position, the lever applies a constant compressive force on the core to hold the core together during the brazing operation.

18 Claims, 3 Drawing Sheets

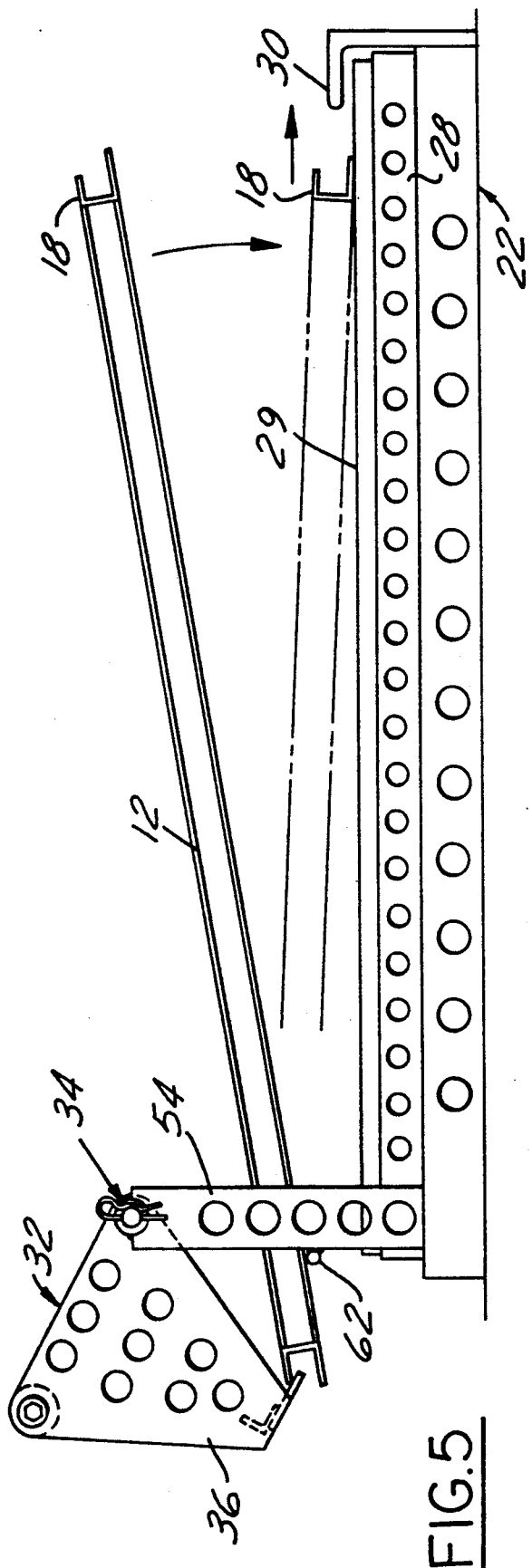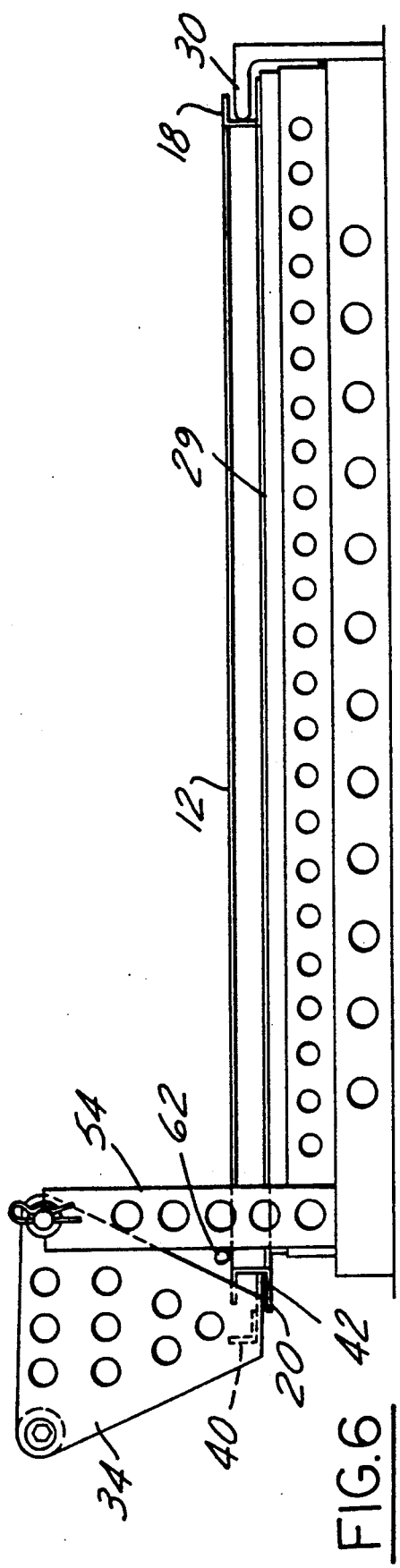

COMPRESSIVE BRAZING FIXTURE

BACKGROUND OF THE INVENTION

1. Field of the Invention

The present invention relates generally to a brazing fixture for receiving an article to be brazed. More particularly, the present invention relates to a brazing fixture for receiving heat exchanger cores therein.

2. Background Information

Typical heat exchanger cores are manufactured by assembling a plurality of tubes interleaved with fins between a pair of side support members. The core is precompressed by tightening a steel band around the core before brazing. The core assembly is then inserted into a furnace and heated until it brazes together. Following the brazing process, the steel band is cut off and discarded.

During the brazing process, the core shrinks and the steel band becomes loose, no longer applying the necessary compressive force to hold the core together during brazing. This can result in deleterious effects upon the heat exchanger core. Moreover, the process of securing the steel band around the core prior to brazing, removing the band after brazing, and scrapping it is a labor and material intensive process resulting in large amounts of scrap material. It would be advantageous to provide a brazing process to eliminate the steel banding of the heat exchanger core.

SUMMARY OF THE INVENTION

It is an object of the present invention to provide a brazing fixture which eliminates steel banding of the core during the brazing process and which applies a constant compressive force during the brazing process.

The present invention solves the problems associated with a prior art by providing an apparatus for holding a heat exchanger core during a brazing process, the core including a first and second side support member disposed on opposite sides of an assembly of a plurality of interleaved tubes and fins. The apparatus comprises a generally rectangular frame including at least one contact member disposed on one side of the frame for engagement with the first side support member. The frame includes ribs for supporting the heat exchanger core thereon. The apparatus further includes a single lever extending axially along the length of the frame and being pivotally mounted to the frame opposite the contact member. The lever pivots from a first position to allow placement of the heat exchanger core onto the frame to a second position in contact with the second side support member of the heat exchanger core in response to gravity. In the second position, the lever applies a constant compressive force acting on the side support members to hold the plurality of tube and fins together during the brazing process. The apparatus further includes adjustable pivot means secured to the frame for variable positioning of the lever on the frame. This provides an advantage in that the force applied to the heat exchanger can be varied by changing the position of the pivot assembly as well as to accommodate various sized heat exchanger cores.

It of the present invention that the brazing fixture facilitates easy loading and unloading of the heat exchanger core and requires minimal amounts of maintenance during the life of the fixture.

These and other objects, features and advantages of the present invention will become apparent from the following drawings, detailed description and claims which follow.

BRIEF DESCRIPTION OF THE DRAWINGS

FIGS. 5 and 6 are side elevational views of the progressive process of loading a radiator core into the fixture of the present invention.

DETAILED DESCRIPTION OF THE PREFERRED EMBODIMENTS

Figure 1:
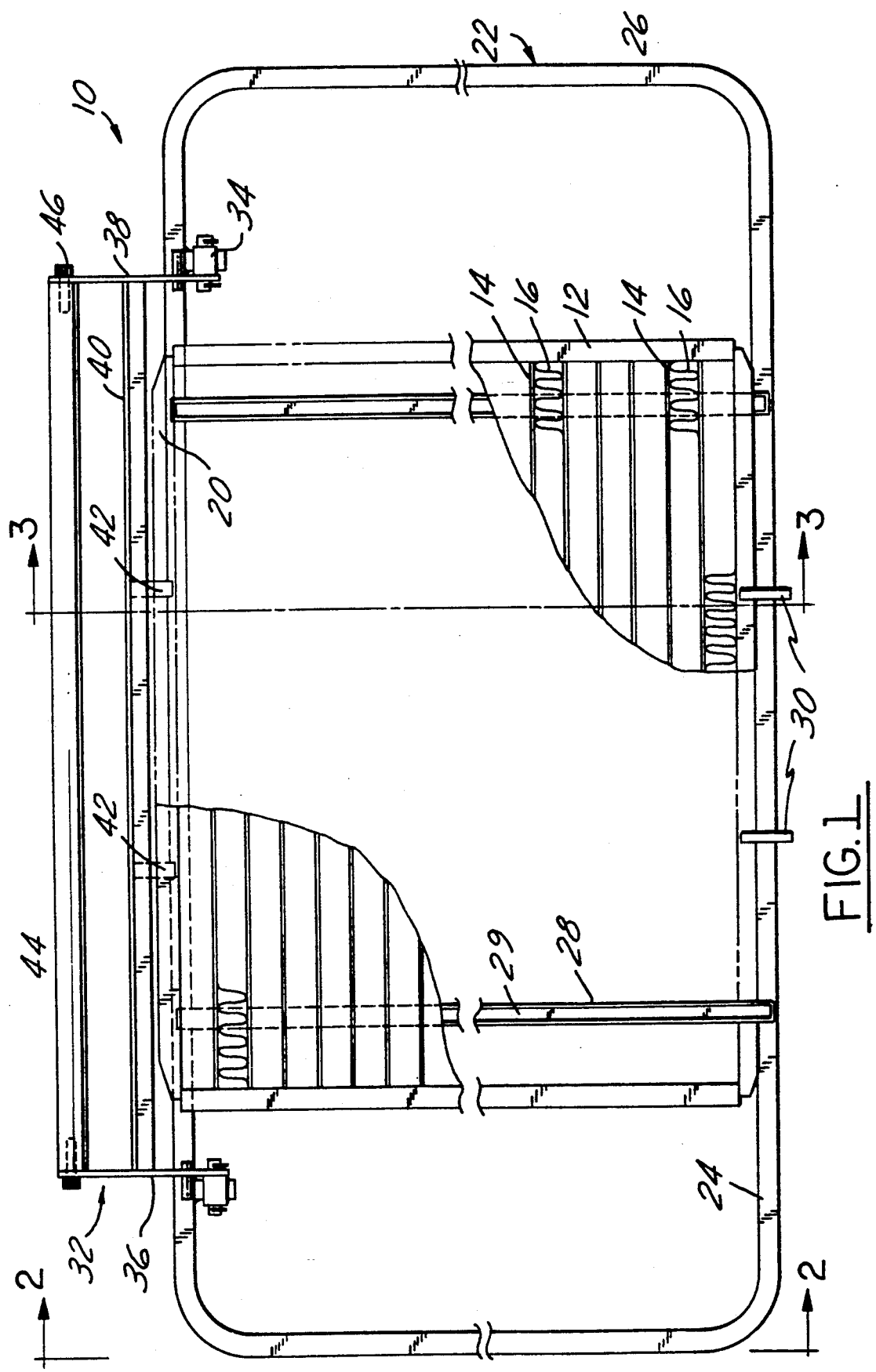
FIG. 1 is a top plan view of a radiator core placed in a brazing fixture of the present invention.

Referring now to the drawings, FIG. 1 shows a brazing fixture 10 of the present invention with a heat exchanger core 12 thereon. The heat exchanger core 12 may be any of a number of known types of heat exchanger cores, typically a radiator core. The radiator core 12 includes a plurality of tubes 14 interleaved with fins 16. The assembly of tubes and fins is disposed between a first side support member 18 and a second side support member 20 of the core 12.

The brazing fixture 10 includes a frame 22 having a pair of longitudinal leg portions 24 and a pair of transverse leg portions 26. Preferably, the frame is fabricated from a heat resistant material, such as stainless steel or other ferrous or aluminum alloys. To decrease the weight of the frame to provide for ease in handling by plant personnel, the frame is fabricated from hollow channel bar stock and, as will be shown below, may include a plurality of apertures through the leg portions to further decrease the weight of the frame. This also provides an advantage in that minimizing the mass of frame 22 lessens the possibility of heat sinking which could affect the quality of the brazed joints.

Figure 4:
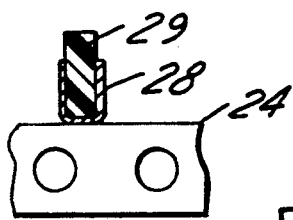
FIG. 4 is a cross-sectional view along line 4—4 of FIG. 3.

The frame 22 further includes a pair of ribs 28 for receiving the radiator core 12 thereon. In the preferred embodiment, and as shown in FIG. 4, ribs 28 are fabricated as U-shaped members having graphite members 29 therein. The core 12 is placed on the graphite members 29 to prevent heat sinking as well as providing for ease in removing the core 12 from the fixture 10.

A pair of contact members 30 are secured to one of the longitudinal leg portions 24 of the frame. Contact members 30 engage the first side support member 18 of the radiator core 12. Two contact members 30 are utilized to provide for minimal contact area with the radiator core to avoid heat-sinking during the brazing process.

Figure 2:
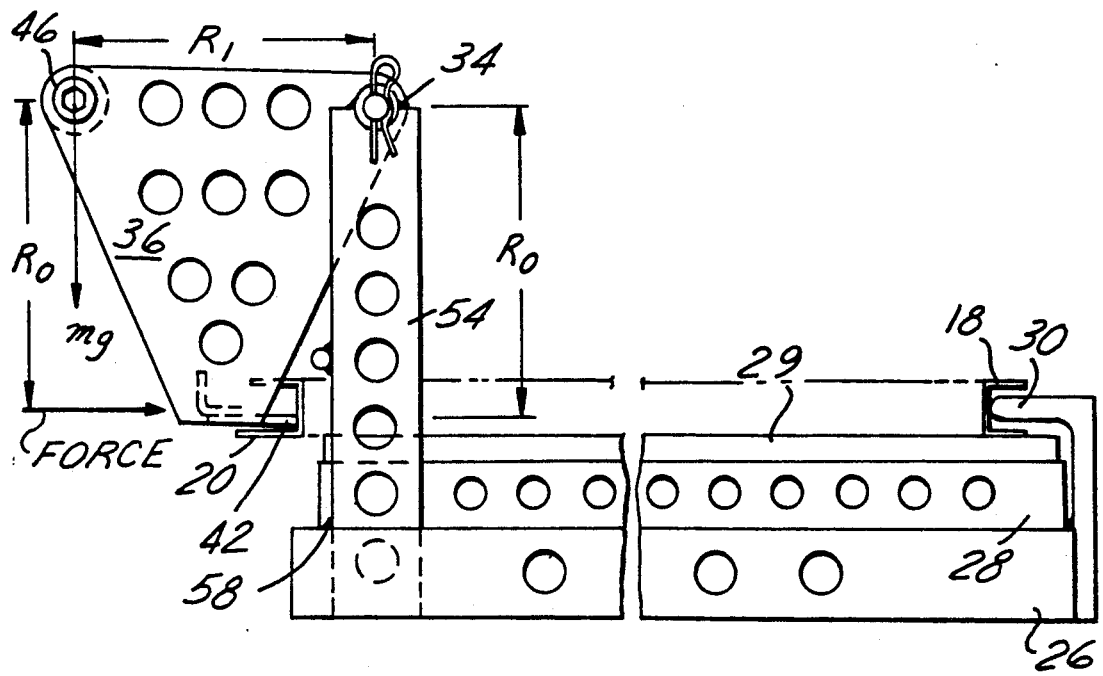
FIG. 2 is a side elevational view along line 2—2 of FIG. 1.
Figure 3:
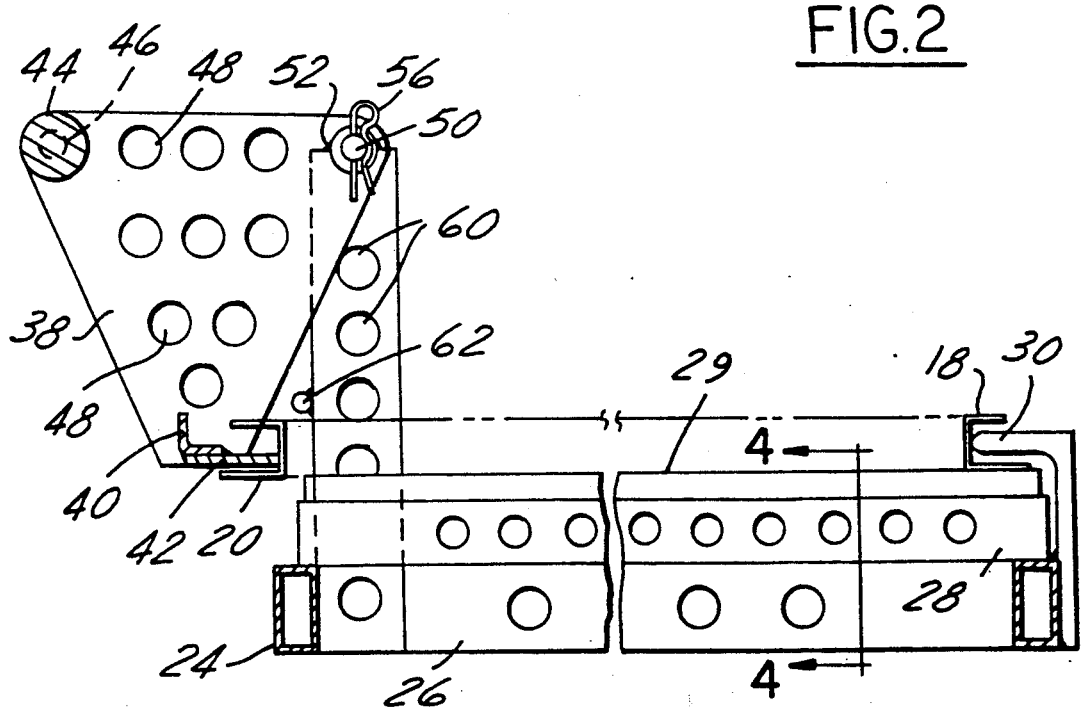
FIG. 3 is a cross-sectional view along line 3—3 of FIG. 1.

The brazing fixture 10 also includes a single lever 32 disposed axially along one of the longitudinal legs 24 on the side of the frame 22 opposite contact members 30. Lever 32 is pivotally secured to the frame 22 at two pivot assemblies 34 which will be described in greater detail below. The lever assembly 32 includes a pair of support arms 36, 38 connected to pivot assemblies 34 as well as an elongate contact beam 40 disposed between support arms 36, 38. As shown in FIGS. 2-3, the contact beam 40 typically is welded to one corner of the support arms 36, 38. The contact beam 40 includes a pair of contact members 42 diametrically opposed from contact members 30 which during use, contact the radiator core side support 20 to provide a compressive force to the radiator core 12 to hold the plurality of tubes and fins together during the brazing process. The lever assembly 32 further includes an elongate bar 44 having a predetermined weight which, in response to gravity, as will be described below, provides the necessary compressive force to hold the radiator core tightly together during the brazing process. In the preferred embodiment, the bar 44 weighs between 1-2 pounds to provide a compressive force of between 2-5 psi. The elongate bar 44 can be secured to the support arms 36, 38 in any of a number of known conventional ways, such as by threaded rod fastener 46.

The support arms 36, 38 are generally planar, triangularly-shaped members having a plurality of apertures 48 disposed therein. Apertures 48 not only provide for reducing the weight of the brazing fixture, but also provide for adjustability of the lever assembly 32 with respect to the frame 26 and radiator core 12 as well as providing for adjustability in the amount of force to be applied against the radiator core 12. For example, as shown in FIG. 2, the force, F, to be applied against the radiator side support 20 is equal to:

$$F_{orce} = \frac{mg\, R1}{R_0}$$

wherein Force equals the force to be applied against the radiator core; mg is the mass of the bar 44 times the gravitational constant (g); $R_1$ is the distance between the weighted bar and the pivot point of the lever assembly relative to the frame; and $R_0$ is the distance between the weighted bar 44 and the contact members 42. By moving the weighted bar 44 to any of the apertures 48, the values of $R_1$ and $R_0$ change thus increasing or decreasing the force applied against the radiator core 12. It should be readily apparent that the support arm 36, 38 may be configured in a variety of shapes having a plurality of apertures therein. For example, the support arms could be T-shaped with a generally horizontal portion and a vertical portion. The present invention is not meant to be limited solely to triangularly-shaped support arms.

As shown in FIGS. 2-3, the lever assembly 32 is pivotally connected to the frame 26 by means of the pivot assemblies 34. The pivot assemblies 34 each includes a pivot bar 50 secured such as by weld 52 to a flange 54. The flange 54 is secured to the frame, such as by weld 58 and includes a plurality of apertures 60 therein. The pivot bar 50 includes a small aperture disposed on each end thereof through which pins 56 are received to lock or to prevent the side support arms 36, 38 from sliding off bar 50. The position of lever assembly 32 can be changed relative to the frame 26 or radiator core 12 by attaching the support arms at any of apertures 48 over pivot rod 50 or by connecting the support arms 36, 38 to any of apertures 60 using a similar, removable pivot rod having apertures at both ends for receiving pins therethrough. By adjusting the position of the support arms relative to the flange 54, the values of $R_1$ and $R_0$ change as explained above to vary the amount of force and the position of the lever assembly 32. As such, apertures 48 and 60 as well as pivot rod 50 and pins 56 comprise adjustable pivot means for variable positioning of the lever on the frame as well as variable force providing means. As before, the support arms 36, 38 can be fabricated from any of a number of known heat resistant materials, such as alloyed steels, stainless steels, or aluminum alloys. It should readily be apparent to those skilled in the art that the support arms 36, 38 can be fabricated in any of a number of known, conventional methods, such as stamping.

It may also be desirable to provide the brazing fixture 10 with a positive stop member 62 to prevent the lever assembly 32 from pivoting about rod 50 too great a distance toward the core 12. The stop member 62 prevents too great a compressive force from being applied to the radiator core 12 during brazing. The positive stop member 62 can be secured to the flanges 54 so that after the support arms 36, 38 have traveled a predetermined distance, the side support arms 36, 38 contact the stop member 62 to prevent further pivotal movement of the lever assembly. Alternatively, the stop members could be secured to the side support arms.

FIGS. 5 and 6 show the progression of steps necessary to place a radiator core 12 into the brazing fixture 10 of the present invention. As shown in FIG. 5, the radiator side support member 20 is brought into engagement with contact members 42 of the lever assembly 32. The plant operator forces the lever assembly 32 to pivot about rod 50 by pushing the radiator core 12 toward the lever assembly 32 to a first position wherein sufficient clearance is achieved between the first side support member 18 of radiator core 12 and the contact members 30 attached to the frame 22. Once sufficient clearance is achieved, the radiator core 12 is set upon the graphite members 29 disposed in the U-shaped channeled ribs 28. In response to gravity due to weighted bar 44, the lever assembly 32 then pivots back toward the contact member 30 side of the frame, causing the radiator core 12 to slide axially along the frame in a direction generally perpendicular to the longitudinal leg portions 24 of the frame. The lever assembly 32 pivots to a second position wherein radiator core side support member 18 engages contact members 30 as shown in FIG. 6. Thereafter, the lever assembly 32 provides a constant compressive force acting on the radiator core 12 during the brazing process to provide a uniform compressive force against the core 12 through the completion of the brazing process. In this manner, should shrinkage occur during brazing, the lever assembly 32 maintains a constant force by the pivoting movement about pivot rod 50. Furthermore, the present invention also provides a downward acting force component to be directed against the radiator core 12 so that the core 12 will not rise out of or off the fixture 10.

It should be readily apparent to those skilled in the art that various modifications and alterations of the present invention are readily available without departing from the spirit and scope of the present invention. For example, the brazing fixture may be formed from a variety of materials and in a variety of configurations to accommodate heat exchangers of various shapes and sizes. The brazing fixture of the present invention may also be utilized to braze articles other than heat exchangers that require constant clamping pressure during the brazing operation because of expansion/contraction dimensional instability at brazing temperatures. Furthermore, a pair of lever assemblies may be utilized at orthogonal sides of the frame to provide a compressive force in two mutually perpendicular directions against the heat exchanger core. Accordingly, it is the following claims including all equivalents, which determine the scope of the invention.

What is claimed:

1. An apparatus for holding an article during a brazing process, comprising:
   a generally rectangular frame including an article contact member disposed on one side thereof and ribs for supporting said article thereon; and
   a single lever extending axially along the length of said frame and being pivotally mounted to said frame opposite said contact member, said lever being operative to pivot from a first position to allow placement of said article onto said frame to a second position in contact with said article in response to gravity such that in the second position, said lever applies a constant compressive force to said article during the brazing process.

2. An apparatus according to claim 1, further including adjustable pivot means secured to said frame for variable positioning of said lever on said frame and operative to vary the amount of force to be exerted against said article.

3. An apparatus according to claim 1, wherein said lever comprises a pair of support arms having hinge means associated therewith, an elongate contact beam disposed between said arms and operative to contact said article when said lever is pivoted into said second position, and gravity responsive compression means interposed between said arms for pivoting said lever from said first position to said second position.

4. An apparatus according to claim 3, wherein said gravity responsive compression means comprises an elongate bar having a predetermined weight.

5. An apparatus according to claim 4, wherein each one of said pair of support arms comprises a generally planar member having a plurality of apertures formed therein.

6. An apparatus according to claim 5, wherein said hinge means comprises an aperture formed in said planar member operative to receive a pin therethrough about which said lever pivots.

7. An apparatus according to claim 3, wherein said elongate contact beam includes at least one contact member projecting therefrom adapted to contact said article during brazing.

8. An apparatus according to claim 5, wherein said generally planar member is triangularly-shaped.

9. An apparatus according to claim 5, wherein at least one of said support arms includes a positive stop operative to engage said frame after said lever has pivoted a predetermined distance.

10. An apparatus according to claim 2, wherein said adjustable pivot means comprises a pair of flange members secured to said frame and projecting generally perpendicularly from the plane of said frame.

11. An apparatus according to claim 10, wherein each of said pair of flanges includes a plurality of apertures, each aperture being operative to receive a pin therethrough about which said lever pivots.

12. An apparatus for holding a heat exchanger having a core during a brazing process, the core including a first and second side support members disposed on opposite sides of an assembly of a plurality of interleaved tubes and fins, said apparatus comprising:
   a generally rectangular frame including at least one contact member disposed on one side thereof for engagement with said first side support member and further including ribs for supporting said core thereon; and
   a single lever extending axially along the length of said frame and being pivotally mounted to said frame opposite said contact member, said lever being operative to pivot from a first position to allow placement of said core onto said frame to a second position in contact with said second side support member of said core in response to gravity such that in the second position, said lever applies a constant compressive force acting on said side support members to hold said plurality of tube and fins together during the brazing process.

13. An apparatus according to claim 12, wherein said lever comprises a pair of support arms having hinge means formed thereon, an elongate contact beam disposed between said arms and operative to contact said second side support member when said lever is pivoted into said second position, and an elongate bar having a predetermined weight interposed between said arms operative to pivot said lever from said first position to said second position in response to gravity.

14. An apparatus according to claim 13, wherein each one of said pair of support arms comprises a generally planar, triangularly shaped member having a plurality of apertures formed therein for receiving a pin therethrough about which said lever pivots.

15. An apparatus according to claim 14, wherein said elongate contact beam is interposed between said said support arms and includes at least one contact finger projecting therefrom adapted to contact said second side support member during brazing.

16. An apparatus according to claim 15, wherein at least one of said support arms includes a positive stop operative to engage said frame after said lever has pivoted a predetermined distance.

17. An apparatus according to claim 15, wherein said apparatus further includes adjustable pivot means secured to said frame for variable positioning of said lever relative to said frame, said adjustable pivot means comprising a pair of flange members secured to said frame and projecting generally perpendicularly from the plane of said frame, each of said pair of flanges includes a pin secured thereto about which said lever pivots, said pin being adapted to be received in an aperture of said support arms so that the force to be applied against said second side support can be varied.

18. An apparatus for holding a radiator core during a brazing process, the core including a first and second side support members disposed on opposite sides of an assembly of a plurality of tubes interleaved with fins, said apparatus comprising:
   a generally rectangular frame including:
      a pair of contact members disposed on one side thereof for engagement with said first side support member;
      a pair of ribs having a graphite layer thereon for supporting said radiator core thereon; and
      a pair of flange members secured to said frame and projecting generally perpendicularly from the plane of said frame, each of said pair of flanges includes a pin secured thereto which defines a pivot axis thereabout and a plurality of apertures therein;
   a single lever extending axially along the length of said frame and being pivotally mounted to said frame opposite said contact members, said lever being operative to pivot from a first position to allow placement of said radiator core onto said frame to a second position in contact with said second side support member of said radiator core in response to gravity such that in the second position, said lever applies a constant compressive force acting on said side support members to hold said plurality of tube and fins together during the brazing process, said lever comprising:

a pair of triangularly shaped support arms having a plurality of apertures therein for receiving said pin therethrough to pivotally secure said lever to said flanges;

an elongate contact beam disposed between said support arms and operative to contact said second side support member when said lever is pivoted into said second position; and an elongate bar having a predetermined weight interposed between said support arms and operative to pivot said lever from said first position to said second position in response to gravity.

* * * * *